United States Patent
Guimet et al.

(10) Patent No.: US 10,270,115 B2
(45) Date of Patent: Apr. 23, 2019

(54) MEMBRANE FOR A PROTON EXCHANGE MEMBRANE FUEL CELL

(71) Applicants: COMMISSARIAT A L'ENERGIE ATOMIQUE ET AUX ENERGIES ALTERNATIVES, Paris (FR); UNIVERSITE DE CERGY-PONTOISE, Cergy-Pontoise (FR)

(72) Inventors: Adrien Guimet, Grenoble (FR); Arnaud Morin, Grenoble (FR); Linda Chikh, Maisons-Laffitte (FR); Odile Fichet, Poissy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 186 days.

(21) Appl. No.: 15/108,719

(22) PCT Filed: Dec. 12, 2014

(86) PCT No.: PCT/FR2014/053306
§ 371 (c)(1),
(2) Date: Jun. 28, 2016

(87) PCT Pub. No.: WO2015/107276
PCT Pub. Date: Jul. 23, 2015

(65) Prior Publication Data
US 2016/0322661 A1     Nov. 3, 2016

(30) Foreign Application Priority Data

Jan. 16, 2014 (FR) .................................. 14 50328

(51) Int. Cl.
*H01M 8/00* (2016.01)
*H01M 8/1044* (2016.01)
(Continued)

(52) U.S. Cl.
CPC ....... *H01M 8/1044* (2013.01); *H01M 8/1039* (2013.01); *H01M 8/1081* (2013.01);
(Continued)

(58) Field of Classification Search
CPC ....... H01M 2300/0082; H01M 8/1039; H01M 8/1044; Y02P 70/56
See application file for complete search history.

(56) References Cited

U.S. PATENT DOCUMENTS

| | | | | |
|---|---|---|---|---|
| 6,914,084 B1 * | 7/2005 | Soczka-Guth | ......... | B01D 71/52 521/27 |
| 2010/0234479 A1 * | 9/2010 | Lalgudi | .................. | H01B 1/122 521/30 |
| 2011/0303868 A1 * | 12/2011 | Sienkiewicz | .............. | C08J 5/22 252/62.2 |

FOREIGN PATENT DOCUMENTS

WO   WO-2011/035795 A1   3/2011

OTHER PUBLICATIONS

International Search Report and Written Opinion issued in Application No. PCT/FR2014/053306 dated Mar. 16, 2015.
(Continued)

*Primary Examiner* — Cynthia H Kelly
*Assistant Examiner* — Monique M Wills
(74) *Attorney, Agent, or Firm* — Marshall, Gerstein & Borun LLP (57) ABSTRACT

A membrane for a proton exchange membrane fuel cell including, by weight with respect to the total weight of the membrane:
  from 50 to 95% of polymer A; and
  from 5 to 50% by weight of polymer B;
A being a cation exchange fluorinated polymer; and
(Continued)

B being a hydrocarbon aromatic polymer different from polymer A, and comprising at least one aromatic ring on its polymer chain.

10 Claims, 4 Drawing Sheets

(51) Int. Cl.
*H01M 8/1039* (2016.01)
*H01M 8/1081* (2016.01)
*H01M 8/1018* (2016.01)

(52) U.S. Cl.
CPC .............. *H01M 2008/1095* (2013.01); *H01M 2300/0082* (2013.01); *Y02P 70/56* (2015.11)

(56) References Cited

OTHER PUBLICATIONS

Pan H. et al., "Proton exchange membranes based on semi-interpenetrating polymer networks of fluorine-containing polyimide and Nafion®," *Journal of Power Sources*, vol. 195, No. 10 (2010).
Chikh L. et al., "(Semi-)Interpenetrating polymer networks as fuel cell membranes," *Journal of Membrane Science*, vol. 368, No. 1-2 (2011).
Delhorbe et al., "Fluorohexane network and sulfonated PEEK based semi-IPNs for fuel cell membranes," *Volume* 389, (2011).
Xiao P. et al., "Physically stable and high performance Aquivion/ePTFE composite membrane for high temperature fuel cell application," *Journal of Membrane Science*, vol. 442 (2013).

\* cited by examiner

MEMBRANE FOR A PROTON EXCHANGE MEMBRANE FUEL CELL

CROSS-REFERENCE TO RELATED APPLICATIONS

This application is a national stage application under 35 U.S.C. § 371 and claims the benefit of priority of international application no. PCT/FR2014/053306, filed Dec. 12, 2014, which claims the benefit of priority under 35 U.S.C. §. 119 of French patent application no. 1450328, filed Jan. 16, 2014, the entire contents of each being hereby incorporated herein by reference, in its entirety and for all purposes.

TECHNOLOGICAL FIELD

The object of the present invention relates to a membrane for a fuel cell of PEMFC type (proton exchange membrane fuel cell). Such a proton exchange membrane comprises a mixture of polymers.

The field of use of the present invention more particularly relates to the conversion of chemical energy into electric energy and in the form of heat.

BACKGROUND

Fuel cells, and particularly PEMFCs, are relatively attractive due to their high theoretical efficiency and to the non-polluting nature of the reaction byproducts.

Further, they provide a large power range, which makes it possible to envisage their use for stationary applications, such as high-power installations for electric power generation, as well as for electric vehicles, or any other device requiring an autonomous power source (electric generating unit, portable electronic device, etc.).

Generally, a proton exchange membrane fuel cell operates by oxidation of the fuel (hydrogen or methanol, for example) at the anode, and by proton transfer from the anode compartment to the cathode compartment through the proton exchange membrane. The electrons resulting from the oxidation reaction are conveyed back to the cathode via an external circuit.

Thus, the chemical energy may be converted into electric energy and into heat.

PEMFC fuel cells have many advantages, such as a lack of sensitivity to carbon dioxide; a low operating temperature which allows a fast start; a flexibility of use and of heat management; a decrease of electrode corrosion problems; and a lack of leakage of the electrolyte.

However, they also have disadvantages such as, for example, a high sensitivity to carbon monoxide; a low operating temperature (lower than 100° C.), which does not enable to use the heat; and an expensive catalyst (generally based on platinum) and membrane.

Preferably, the membrane (polymer electrolyte) of a PEMFC is impermeable to gases. It advantageously has good mechanical properties and a high proton conduction. Further, the forming of shapes adapted to the different applications should be possible, especially to be able to form thin systems (thickness of a few microns). Finally, the membrane is made of electrochemically and chemically stable polymer.

It may in particular be a polymer membrane based on ionomers of perfluorosulfonate type (PFSA), such as Dupont's Nafion® and Solvay Specialty Polymers' Aquivion®. In such perfluorosulfonate ionomers, the proton conductivity of the membrane is ensured by —$SO_3H$ groups (sulfonic acid function).

However, such membranes have disadvantages due to their permeability to methanol and to hydrogen. Further, their mechanical properties degrade beyond their optimal operating temperature (80° C.).

This is particularly constraining for the automobile field, for example. Indeed, for this type of application, a PEMFC operating between −30 and 120° C., and in the presence of slightly humidified gases (between 0 and 50% of relative humidity) is required.

The performance of a PEMFC is also linked to the following issues:

the presence of carbon monoxide (CO) generally causes a poisoning of the catalysts. When the hydrogen (fuel) is obtained by reforming, it generally contains traces of carbon monoxide. The presence of CO lowers the efficiency of the platinum-based catalyst which adsorbs it. The performances of the PEMFC are thus lowered. On the other hand, the adsorption of CO on the platinum-based catalyst is favored at low temperature, but affected at high temperature due to the negative entropy of the adsorption reaction. Thus, the tolerance to CO increases with temperature. The performance degradation of the PEMFC due to the CO poisoning may thus be significantly attenuated at high temperature (approximately 140° C.).

the thermal management of a PEMFC is more complicated at low temperature, given that the cell generates from 40 to 50% of its energy in the form of heat. Accordingly, when the cell operates at low temperature, large quantities of energy have to be dissipated. Conversely, when the cell operates at temperatures in the range from 120 to 140° C., the heat generated by the cell enables to maintain the system temperature and requires smaller cooling systems. This point is particularly important for an application in the automobile industry. Further, for temperatures higher than 100° C., the generated heat may also be used for other purposes (heating in cogeneration mode, for example).

the humidification of the membrane is essential at low temperature, given that PFSA-type membranes require being constantly hydrated. The additives necessary for the humidification complicate and decrease the reliability of the system. The humidification is necessary given that the proton conductivity of the membrane increases with the quantity of water contained in the polymer matrix, which itself increases with the quantity of water outside of the membrane (relative humidity). Such a humidification is all the more complex to achieve and to manage and requires all the more energy as the temperature is high.

As a summary, there is a need to develop a PEMFC membrane capable of being used at low temperature as well as at high temperature with gases having a low water content (<50% of relative humidity).

To overcome these problems, the Applicant has designed a proton exchange membrane having a better thermomechanical stability at high temperature than prior art membranes, and this, without altering the proton conductivity of said membrane.

The technical problem solved by the present invention thus is to improve the thermomechanical properties of a fuel cell membrane, thus capable of being used in a larger temperature range than prior art membranes, thus allowing a use with a low relative humidity.

SUMMARY OF THE DISCLOSURE

The Applicant has developed a proton exchange membrane comprising a mixture of two polymers having different properties: a fluorinated proton exchange polymer and an aromatic polymer.

Thus, the association of these two types of polymers gives the final material thermomechanical properties improved with respect to prior art membranes, and this while contributing to its proton conductivity.

Such a combination thus enables to use the proton exchange membrane according to the present invention at higher temperature. Further, the membrane has proton conductivity performances at least similar to those of prior art fluorinated membranes.

More specifically, the present invention relates to a membrane for a proton exchange membrane fuel cell comprising, by weight with respect to the total weight of the membrane:
from 50 to 95% of polymer A, advantageously from 70 to 95%; and
from 5 to 50% of polymer B, advantageously from 5 to 30%;
A being a cation exchange fluorinated polymer; and
B being a hydrocarbon aromatic polymer different from polymer A, and comprising at least one aromatic ring on its polymer chain.

Polymers A and B form a mixture. They are not cross-linked with each other. Typically, the membrane according to the invention results from the mixture of polymers A and B previously formed independently from each other. The Applicant indeed considers that the crosslinking of polymers A and B may decrease the ion conduction properties, particularly when it is performed via the sulfonate groups.

The proton exchange membrane is advantageously formed of polymers A and B. In other words and advantageously, the membrane comprises no components other than polymers A and B.

"Cation exchange polymer" means a polymer comprising groups capable of exchanging cations or protons.

"Fluorinated polymer" means a polymer having its repeat unit (monomeric unit) comprising fluorine atoms. It is formed of monomeric units resulting from the polymerization of monomers. It may also be a perfluorinated polymer, that is, a polymer having all the C—H groups of at least one monomeric unit integrally substituted with C—F groups.

"Aromatic polymer" means a polymer comprising, on its backbone, the repetition of a pattern containing at least one ring comprising a conjugated π system, formed of double bonds. The aromatic rings may be separated by a carbon chain and/or a heteroatom of oxygen (O) or sulfur (S) type, for example.

The aromaticity of polymer B is not necessarily present all along its backbone. It relates to at least one group of at least one repeat unit, located on the polymer backbone.

In other words, polymer B may be defined as follows:
$B=(C-D)_p$, C and D being one or two repeat units (monomeric units) of polymer B, at least C or D comprising one aromatic ring on the backbone of polymer B, p being an integer.

Typically, polymer B may comprise an arene group on its backbone, that is, a derivative of a monocyclic or polycyclic hydrocarbon aromatic compound having at least two carbon atoms on the backbone of polymer B.

Polymer B is a sulfonate polymer, that is, a polymer comprising —SO$_3$H groups.

Polymer A is by definition a cation exchange polymer and thus enables to ensure the proton conductivity of the membrane. It is an ionomer, that is, a polymer comprising ionizable and/or ionic groups.

Polymer A is a fluorinated polymer, advantageously perfluorinated. In other words, and according to a preferred embodiment, it comprises no C—H groups, the latter being substituted with C—F groups.

Polymer A comprises groups selected from the group comprising groups —SO$_3^-$X$^+$; —PO$_3^-$X$^+$; and —COO$^-$X$^+$; X being a hydrogen atom or a cation.

In the context of the present invention, X advantageously is a hydrogen atom, a metal cation of an alkaline or of an alkaline earth, and more preferably cations Na$^+$ and K$^+$. X may also be an ammonium, preferably a quaternary ammonium.

Possibly, before being used as a membrane in a fuel cell, the X groups of the membrane according to the present invention are advantageously converted into hydrogen atoms, particularly by treatment with a Bronsted acid.

Polymer A may in particular be a sulfonic perfluorinated polymer. It may have the following formula:

with x=from 100 to 1,000; y=from 3.5 to 7.5, and z=from 0 to 3.

The molecular weight of polymer A may in particular be in the range from 10,000 to 10,000,000 g/mol, advantageously from 100,000 to 1,000,000 g/mol.

As an example, polymer A may in particular be one of the PFSA perfluorosulfonate polymers commercialized under trade names Nafion® (Du Pont); 3M Membrane (3M); Aciplex™ (Asahi Glass); and Aquivion® (Solvay Specialty Polymers, for example, Aquivion® D75-20BS and Aquivion® D70-20BS). It preferably is an Aquivion®-type polymer.

The ionomers may appear in the form of a dispersion in a solvent, particularly an aqueous dispersion.

Nafion® is a PFSA perfluorosulfonate polymer having CAS number: 31175-20-9.

These ionomers differ, in particular, by the length of the fluorinated dangling chain and the average distance between fluorinated dangling chains. As already indicated, they are often commercialized in the form of a dispersion, which may require a prior step of removing the solvent to recover the ionomer in solid form to associate it with hydrocarbon aromatic polymer B.

Thus, for example, polymer B may be non-soluble in the dispersion of polymer A. In this case, a solvent common to the two polymers enables to form the mixture, whereby the dispersion of polymer A needs to be dried.

Polymer A may also be in suspension/dispersion in a solvent mixture where polymer B is soluble. In this case, it is not necessary to dry polymer A.

According to another embodiment, an additional solvent (co-solvent) may be added to the solution of polymer A, so that polymer B is soluble in the resulting solution of polymer A in the solvent/co-solvent mixture.

Further, polymer A may also appear in the form of powder or of granulate.

As concerns polymer B, it may have a thermal and mechanical stability range due to the presence of aromatic rings on its backbone. Indeed, this polymer is advantageously stable up to 220° C., or even 250° C.

This 250° C. temperature corresponds to the mechanical relaxation temperature. The mechanical stability range may thus extend up to 220° C. while the thermal stability range of polymer B may extend beyond 250° C.

Polymer B may in particular be selected from the group particularly comprising poly(aryl sulfone); (poly(aryl ether ketone); poly(imide); poly(aryl carbonate); poly(aryl ether ether ketone); poly(aryl ether ketone ketone); and poly(aryl ether sulfone) . . .

The molecular weight of polymer B may in particular be in the range from 1,000 to 200,000 g/mol, advantageously from 10,000 to 70,000 g/mol. It advantageously comprises from 5 to 500 repeat patterns (monomeric units), more advantageously still from 10 to 50.

It may in particular be a polymer having one of its repeat patterns (monomeric units) comprising at least one aryl group on the backbone of the polymer, and capable of being selected from the group comprising poly(bisphenol A carbonate); poly(ether ketones); poly(ether ketone ketones); poly(ether ether ketones); poly(sulfones); poly(phenyl sulfones); poly(ether imides); poly(2,6-dimethyl phenylene oxides); poly (ether sulfones); poly(amide imides) and particularly the poly(amide imides) distributed by Solvay under trade name Torlon®; poly(pyromellitimides) and particularly Kapton®; and poly(benzimidazoles).

Polymer B may advantageously be selected from the group comprising polyarylenes; polyarylene ethers; fluorinated polyarylene ethers; polysulfones; poly(benzimidazoles); poly(ether ketones), poly(ether ketone ketones), poly (ether ether ketones); poly(ether sulfones); poly(ether imides); polycarbonates; poly-2,6-dimethyl phenylene oxide; polyamide-imide; and polypyromellitimide.

As already indicated, polymer B comprises —SO₃H groups. It may possibly be obtained by functionalization with —SO₃H groups of one of the above-mentioned polymers.

The proton conductivity of polymer B may be improved by functionalization with groups of imidazolium, carboxylic acid (—COOH), phosphonic acid (—PO₃H), or sulfonic acid (—SO₃H) type. For example, polyarylenes may in particular be functionalized by a sulfonating agent, such as chlorosulfonic acid, thus introducing sulfonic acid groups on the aromatic rings of polymer B. The substitution is performed on the aromatic ring (aryl) located on the backbone of the polymer.

The swelling in an aqueous medium of a polymer proton exchange membrane is generally proportional to the number of exchanger groups (SO₃H for example). Now, according to the polymer family used, the ability to swell in an aqueous medium may also mean a mechanical fragility in the dry state in certain cases. A tradeoff thus has to be found between the proton conductivity and the mechanical properties of the membrane.

It will be within the abilities of those skilled in the art to adjust the degree of functionalization of polymer B according to the field of application of the membrane according to the present invention. Thus, advantageously, polymer B may comprise from 1 to 4 substitutions per repeat unit (monomer) on its backbone. Generally, each repeat unit may comprise at least one substitution and at most 2 substitutions per aromatic ring. Thus, each repeat unit typically comprises from 4 to 6 aromatic rings, and from 2 to 4 substitutions.

According to a specific embodiment, polymer B may in particular be a compound selected from the group comprising the compounds having the following formulas, as well as their derivatives (Tg=glass transition temperature):

Poly(Aryl Ether Ether Cétone)
Tg = 150° C.

Poly(Aryl Carbonate)
Tg = 150° C.

Poly(Aryl Ether Cetone)
Tg = 160° C.

Poly(Aryl Ether Cetone Cetone)
Tg = 160° C.

Poly(Aryl Sulfone)
Tg = 190° C.

Poly(Ether Imide)
Tg = 210° C.

Poly(2,6-diméthyloxyde de phénylène)
Tg = 210° C.

Poly(Aryl Ether Sulfone)
Tg = 220° C.

-continued

Poly(Amide Imide)
Tg = 260° C.

Poly(Pyromellitimide)
Tg = 370° C.

Poly(Benzimidazole)
Tg = 390° C.

With $R_1$=O, $SO_2$, $CH_2$, $CH_2$—$CH_2$, aromatic ring comprising 5 or 6 carbon atoms, NH, $NR^3$ ($R^3$=linear or branched alkyl group comprising from 1 to 4 carbon atoms, preferably methyl)

and $R_2$=O, $SO_2$, $CH_2$, $CH_2$—$CH_2$, aromatic ring comprising 5 or 6 carbon atoms, NH, $NR^3$ ($R^3$=linear or branched alkyl group comprising from 1 to 4 carbon atoms, preferably methyl).

As already indicated, polymer B necessarily comprises at least one aromatic group on its backbone. Thus, when polymer B is the above-illustrated poly(aryl carbonate), $R_1$ or $R_2$ is necessarily an aromatic ring.

According to a specific embodiment, hydrocarbon aromatic polymer B is a sulfonic polymer, and more advantageously sulfonic poly(ether ether ketone) (S-PEEK).

PEEK (CAS number: 29658-26-2) may comprise cation exchange groups of —$SO_3$—X or —C(=O)—O—X type; X preferably being a proton or a metal cation ($K^+$, $Na^+$ for example).

S-PEEK is a sulfonate polymer, it may thus be a polymer comprising the repetition of the following unit:

With n=0.3 to 1 and m=0.7 to 0 (m+n=1)

The ion exchange capacity (IEC) of a polymer indicates its ability to exchange its protons. It is linked to the water absorption and proton conductivity properties. As an example, the IEC is advantageously in the range from 0.9 to 3 mmol/g for polymer A or polymer B.

Polymer B has a glass transition temperature advantageously in the range from 150 to 400° C.

It is the temperature at which the polymer undergoes a mechanical transition, and thus at which it changes mechanical properties. It may also enable to determine the range of use of the polymers.

The glass transition temperature of polymer A may advantageously be in the range from 80 to 130° C., particularly for PFSA (perfluorosulfonate polymer such as Nafion®).

The present invention also relates to a method of preparing the above-described membrane. It comprises the steps of:

preparing a solution of polymers A and B in at least one solvent;

shaping the membrane from the solution of polymers A and B;

evaporating the at least one solvent;

optionally, regenerating (or exchanging) the membrane by immersing the membrane in an acid solution;

drying the membrane.

The regeneration (or exchange) step may enable to substitute the metal cations of polymer A with hydrogen atoms. Further, this step may also enable to regenerate the —$SO_3H$ functions which could have reacted with the possible amine functions of the solvent used to prepare the solution of polymers A and B, but also to regenerate the $SO_2$—$SO_2$ bridges possibly formed during the thermal evaporation of the solvent. Further, this step may also enable to remove the possible cationic impurities present in the membrane.

The treatment in an acid solution is advantageous when polymer A comprises groups X which are not hydrogen atoms.

The treatment in an acid solution is advantageously implemented in an acid solution having a pH smaller than 2.

It will be within the abilities of those skilled in the art to use the adequate acid solution by using their general knowledge.

According to a specific embodiment, the solution of polymers A and B may be obtained by addition of polymer B into a solution of polymer A. The added polymer B may be in the form of a solution or solid.

According to another specific embodiment, the solution of polymers A and B may be obtained by addition of polymer A into a solution of polymer B. The added polymer A may be in the form of a solution or solid.

Advantageously, a solution of polymer B is added into a solution A, since the latter is typically less viscous and thus easier to add dropwise.

As an example, the solution of polymers A and B may be prepared by addition of polymer B in solid form into a solution of polymer A in DMAc (N,N-dimethylacetamide), given that polymer B is soluble in DMAc.

The two polymer solutions may possibly be prepared within a concentration range advantageously between 100 and 500 mg/mL. It may be in the range from 100 to 400 mg/mL, in the order of 400 mg/mL.

Generally, the mixture of polymers A and B is homogenized by mechanical stirring of the solution.

The solvent implemented in the method according to the present invention may in particular be selected from the group comprising N-methyl-2-pyrrolidone (NMP); N,N- dimethylacetamide (DMAc); dimethylformamide (DMF); dimethylsulfoxide (DMSO); and the water/alcohol mixture (for example, with a 50/50 ratio by weight, particularly when the alcohol is a primary or secondary alcohol comprising from 1 to 3 carbon atoms such as methanol, ethanol, propanol, or isopropanol).

Generally, the solution of polymers A and B may be prepared at a temperature between the ambient temperature and 60° C.

The shaping of the membrane may be performed according to techniques within the general knowledge of those skilled in the art and particularly according to a technique selected form the group comprising casting-evaporation; coating; sputter deposition; flexography deposition; spin coating; and silk-screening deposition.

The solution may in particular be deposited on a substrate made of glass, of polytetrafluoroethylene (Teflon®), or on a quartz plate.

Generally, the coating may be performed by means of a knife of variable thickness on a glass plate. The resulting membrane (after drying) has a thickness advantageously in the range from 10 to 200 micrometers, more advantageously still between 10 and 50 micrometers.

It will be within the abilities of those skilled in the art to adjust the knife thickness according to the membrane which is desired to be formed. The knife thickness especially depends on the viscosity of the solution and of the coating sweep speed.

As already mentioned, the solution of polymers A and B may also be deposited by a spray, sputtering, flexography, spin coating, or silk-screening type method to obtain a thin layer having a thickness advantageously in the range from 1 micrometer to 1 millimeter.

Such techniques are adequate to form the membrane according to the invention, which has a thickness which is, as indicated, advantageously in the range from 10 to 50 micrometers, and more advantageously still from 10 to 20 micrometers.

Advantageously, the solvent evaporation step may be carried out at a temperature in the range from 80 to 150° C., particularly in a ventilated oven. The oven may also be under vacuum at a pressure advantageously in the range from 1 mbar to 1 bar.

It may also be envisaged to sequence the evaporation in a plurality of steps and at different temperatures. For example, between 1 and 72 hours at ambient temperature and then between 1 and 24 hours at 60-80° C., and then between 1 and 24 hours at 100-150° C.

After the evaporation step, the method may comprise a thermal treatment phase. The thermal treatment is advantageously carried out at a temperature in the range from 180 to 250° C., between 15 minutes and 24 hours. It is implemented at a temperature higher than the glass transition temperature of polymer A, and according to cases above the Tg of certain polymers B. Such an optional treatment enables to increase the mobility of the polymer chains and thus to favor their shaping. The shaping of the polymers within the membrane may in particular influence the properties and the performances when the membrane is used in a fuel cell.

According to the shaping technique used, the membrane preparation method may also comprise a membrane separation step. Thus, when necessary, the membrane may be separated from its support by immersion into ultrapure water having a temperature between the ambient temperature and 50° C., for a duration generally of at least 10 minutes, advantageosuly between 15 and 1,440 minutes, more advantageously in the order of 15 minutes.

It will be within the abilities of those skilled in the art to adjust the water volume and the immersion time, particularly according to the membrane thickness, to the nature of the support, and to the membrane treatment temperature (solvent evaporation step).

Such an immersion thus enables to remove at least part of the solvents.

To ease the membrane separation, it is also possible to treat the glass plates used by silylation thereof or by the deposition of a fluorinated-type hydrophobic spray.

Once formed, the membrane of polymers A and B may advantageously be regenerated or exchanged in acid by immersion in an acid solution.

The acid solution enabling the regeneration of sulfonic sites has a pH advantageously lower than 2. It preferably is an aqueous solution of an acid having a concentration in the range from 0.5 to 12 mol/L, advantageously a hydrochloric acid solution. This is not a doping step, given that the acid is not meant to remain in the membrane. As already indicated, this step particularly aims at replacing possible cations present in the membrane, present due to the impurities or else to the actual manufacturing method, with protons, or at regenerating the —$SO_3H$ functions which may have reacted together or with the solvent.

It may in particular be a 1-M aqueous solution of hydrochloric acid. Other acids may also be used, particularly sulfuric acid or nitric acid. It will be within the abilities of those skilled in the art to adjust the acid concentration particularly according to the nature of the cation exchange groups of polymer A.

As already indicated, the acid solution used has a pH advantageously smaller than 2. The duration of the acid regeneration is advantageously in the range from 15 minutes to 48 hours. On the other hand, the regeneration or the exchange is advantageously performed in a solution having a temperature between the ambient temperature and 60° C.

After regeneration, the membrane may be washed, particularly in water.

The membrane is advantageously dried under vacuum, that is, at a pressure from 10 mbar to 1 bar, preferably from 100 to 400 mbar and preferably at a temperature between the ambient temperature and 80° C. The drying time may be in the range from 1 to 96 hours, preferably from 6 to 48 hours, from 12 to 24 hours. The membrane may be dried at the ambient temperature and relative humidity.

At the end of the regeneration treatment (immersion in an acid solution), the membrane is preferably washed to remove any residual trace of acid.

The membrane is then dried.

The drying also enables to remove traces of organic solvent.

The membrane thus obtained is self-supporting.

It may be directly incorporated in devices suitable for all applications requiring a cation exchange membrane, that is, for PEMFCs ("proton exchange membrane fuel cells") or DMFCs ("direct methanol fuel cells"), electrolyzers, sensors, supercapacitors, batteries.

It may be used for an operation at medium temperature (100-120° C.). Generally, the operating temperature of the membrane according to the present invention may be in the range from −10 to 130° C.

As already indicated, the membrane forming the object of the present invention has a mechanical stability range larger than that of prior art membranes. Indeed, the drop of the storage modulus generally appears around 120° C. in the case of the membrane according to the invention while it is generally in the order of 90° C. for a commercial PFSA membrane (perfluorosulfonate polymer such as Nafion®).

Further, the mechanical relaxation temperature is generally in the range from 150 to 160° C. for the membrane according to the present invention, while it is detected at 120° C. for a commercial PFSA membrane.

The invention and the resulting advantages will better appear from the following non-limiting drawings and examples, provided as an illustration of the invention.

DETAILED DESCRIPTION

1/ Preparation of Polymer Membranes According to the Invention and According to Prior Art Table 1 sums up the composition of each of the prepared membranes. Membranes INV-1 to INV-5 are membranes according to the present invention while membranes CE-1, CE-2, and CE-3 are counterexamples according to prior art.

TABLE 1

Composition of the prepared membranes.

| Membrane | INV-1 | INV-2 | INV-3 | INV-4 | INV-5 | CE-1 CE-3 | CE-2 |
|---|---|---|---|---|---|---|---|
| Polymer A (wt. %) | 70 | 75 | 80 | 85 | 90 | 100 | 0 |
| Polymer B (wt. %) | 30 | 25 | 20 | 15 | 10 | 0 | 100 |

Membranes INV-1 to INV-5 have been prepared according to the following operating mode.

The polymer A (INV-1 to INV-5 and CE-1) used is obtained from a commercial aqueous dispersion of Aquivion® D79-20BS of Solvay Specialty Polymers containing 20 wt. % of polymer, having a mass equivalent to 790 g/eq corresponding to an ion exchange capacity (IEC) equal to 1.27 meq/g.

The polymer A used for counterexample CE-3 is Nafion® (CAS: 31175-20-9).

Before use thereof, polymer A is heated in an oven at 60° C. for 15 hours.

The resulting cracked membrane is then crushed in a mortar to obtain a powder. The powder is dried under vacuum at 50° C. until the thermogravimetric analysis shows that the mass is constant and that there are no further traces of water which would be possibly contained in the initial polymer.

The polymer B used hereafter is S-PEEK (sulfonic poly (ether ether ketone) of ERAS Labo, France). It has a molar mass of 16,100 g/mol, and an ion exchange capacity (IEC) of 1.45 mmol/g. It is formed at 50% by mol of randomly distributed sulfonate units.

1-1/Mixing of the Precursors

For an Aquivion®/S-PEEK (A/B) mixture with a 80/20 mass ratio (INV-3):

800 mg of solid Aquivion® are dissolved in 4 mL of DMAc (N,N-dimethylacetamide) under a magnetic stirring at ambient temperature for 1 hour.

The Aquivion® solution is then filtered by means of a micropore having a pore size of 0.2 micrometer.

200 mg of S-PEEK are dissolved in 1 mL of DMAc under a magnetic stirring at ambient temperature for 1 hour.

The S-PEEK solution is then filtered by means of a micropore having a pore size of 0.2 micrometer.

The S-PEEK solution is then added dropwise to the Aquivion® solution. The mixture is homogenized for 20 minutes under magnetic stirring at ambient temperature, and then filtered by means of a micropore having a 0.2-micrometer pore size.

1-2/Shaping of the Membrane

Polymer membrane A/B is shaped by casting-evaporation after deposition of the solution in a Petri dish.

1-3/Evaporation of the Solvents

The assembly is then thermally treated for 24 hours at 120° C. to remove the solvents.

1-4/Separation of the Membrane

The membrane is separated from its support by immersion into 2 liters of ultrapure water at ambient temperature for 15 minutes, to cover the membrane surface until the membrane separates. Such an immersion thus enables to remove possible solvent residues.

1-5/Membrane Exchange or Regeneration

The self-supporting membrane is immersed into 1.5 L of hydrochloric acid (HCl, 1 M, ambient temperature) for 24 hours, particularly to perform the exchange of —SO$_3$X groups on the sulfonic hydrocarbon aromatic polymer (B) which are possibly in the form of cations or which may have reacted together.

At the end of the acid treatment, the membrane is immersed for 24 hours in ultrapure water to remove acid residues.

1-6/Drying of the Membrane

The membrane is then dried under vacuum at 50° C. and for 2 days, and then at 80° C. for 2 days. Only at the end of the drying is the membrane characterized.

The membrane obtained hereabove is designated as INV-3 (ratio A/B=80/20).

According to this protocol, different membranes have been synthesized.

Membrane INV-1 (ratio A/B=70/30) is synthesized from a mixture of 700 mg of solid Aquivion® dissolved in 3.5 mL of DMAc and 300 mg of S-PEEK dissolved in 1.5 mL of DMAc.

Membrane INV-2 (ratio A/B=75/25) is synthesized from a mixture of 750 mg of solid Aquivion® dissolved in 3.75 mL of DMAc and 250 mg of S-PEEK dissolved in 1.25 mL of DMAc.

Membrane INV-4 (ratio A/B=85/15) is synthesized from a mixture of 850 mg of solid Aquivion® dissolved in 4.25 mL of DMAc and 150 mg of S-PEEK dissolved in 0.75 mL of DMAc.

Membrane INV-5 (ratio A/B=90/10) is synthesized from a mixture of 900 mg of solid Aquivion® dissolved in 4.5 mL of DMAc and 100 mg of S-PEEK dissolved in 0.5 mL of DMAc.

2/Properties of the Membranes 2-1/Dynamic Mechanical Thermal Analysis (DMTA)

The dynamic mechanical thermal analysis of membranes INV-2, INV-3 and INV-4 has been performed by means of a DMTA Q800 device (TA Instruments).

Figure 1:
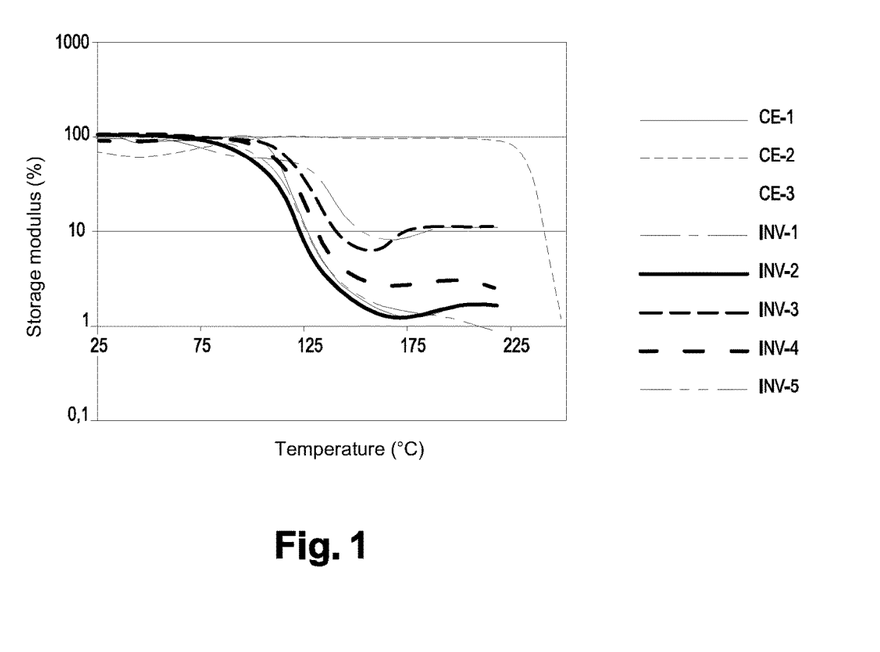
FIG. 1 illustrates the storage modulus according to the temperature of membranes according to the present invention as compared with three membranes of prior art.

The measurement is performed at a 1-Hz frequency and at a 3° C./minute heating rate. The measurements show an increase of the stability range of the storage modulus, from 100 to 125° C. Simultaneously, the mechanical relaxation temperature is increased by 30° C. with respect to that of a commercial Aquivion® membrane, for a composition range from 90 to 70% by mass of Aquivion® (FIGS. 1 and 2).

Figure 2:
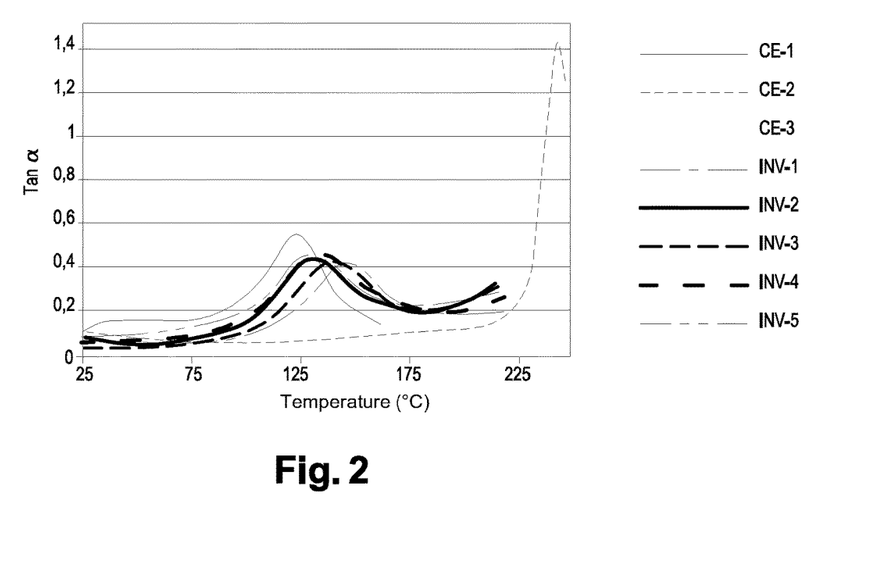
FIG. 2 illustrates tangent a according to the temperature for membranes according to the present invention as compared with three membranes of prior art.

FIG. 2 shows the graph of tangent a according to temperature. Tangent α (tan α=E'/E") corresponds to the ratio of the storage modulus (E') to the loss modulus (E"), these moduli being measured according to temperature during the DMTA analysis.

2-2/Thermogravimetric Analysis (TGA)

The thermograms of the Aquivion®/S-PEEK membrane (INV-1, INV-3, and INV-5) have been recorded by means of an ATG Q50 device (TA Instruments).

The measurements are performed under synthetic air having a gas flow rate of 60 mL/minute and at a heating rate of 20° C./minute.

Figure 3:
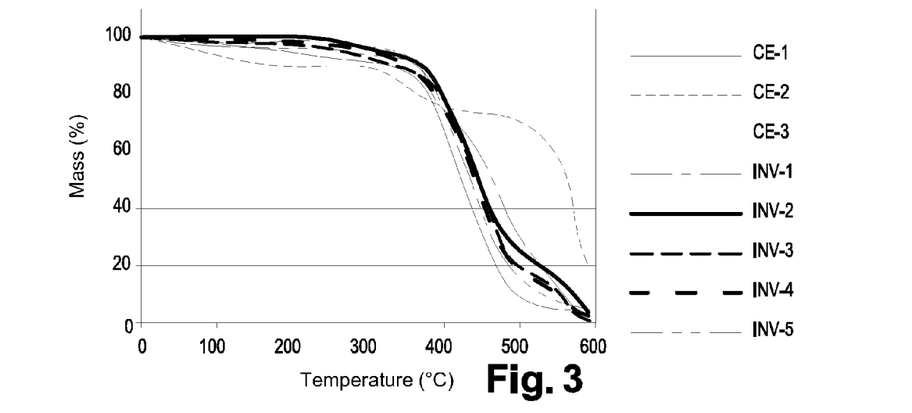
FIG. 3 illustrates the thermograms recorded by thermogravimetric analysis for membranes according to the present invention as compared with three membranes of prior art.

The measurements show that the thermal stability of polymer A (Aquivion®) is kept in the mixture with polymer B (S-PEEK). Indeed, all the membranes formed have a thermal stability up to 350° C. The temperature at which the materials start degrading is raised for a 5% mass loss (FIG. 3).

2-3/Absorption in Ultrapure Water at 15 and 80° C.

The absorption rates of the materials are determined by weighting performed after different immersion times ($m_t$) in ultrapure water at 15 and 80° C. from an initially dry sample of mass $m_0$.

The absorption rate is calculated as follows:

Swelling rate (wt. %)=$[(m_t-m_0)/m_0] \times 100$

Figure 4:
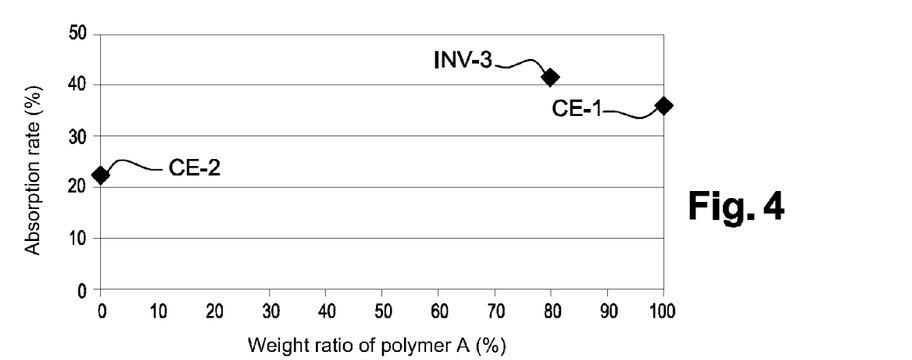
FIG. 4 illustrates the rate of absorption in water at 15° C. of a membrane according to the present invention as compared with two membrane of prior art, according to the weight ratio of polymer A.

The 80/20 membrane (INV-3) has an absorption rate twice greater than that of a membrane of polymer B, S-PEEK (CE-2) at 15° C. (42% for the 80/20 membrane, to be compared with 23% for the S-PEEK membrane) and a value slightly greater than that of a membrane of polymer A, Aquivion® (CE-1) (42% for the 80/20 membrane, to be compared with 35% for the Aquivion® membrane) (FIG. 4).

Figure 5:
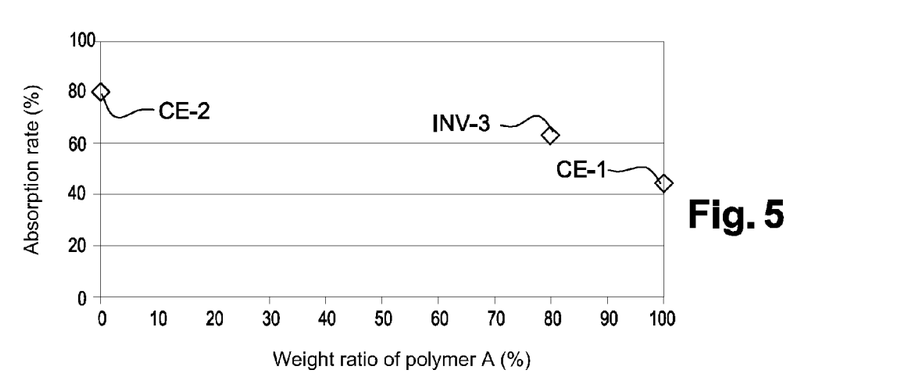
FIG. 5 illustrates the rate of absorption in water at 80° C. of a membrane according to the present invention as compared with two prior art membranes, according to the weight ratio of polymer A.

The 80/20 membrane (INV-3) has an absorption rate twice greater than that of a membrane of polymer B, S-PEEK (CE-2) at 80° C. (65% for the 80/20 membrane, to be compared with 80% for the S-PEEK membrane) and a value slightly greater than that of a membrane of polymer A, Aquivion® (65% for the 80/20 membrane, to be compared with 48% for the Aquivion® membrane) (FIG. 5).

2-4/Proton Conductivity at 19° C.

Each sample is immersed into 1 L of ultrapure water at ambient temperature for 24 hours.

Once swollen, a sample of thickness "e" and of surface "S" is cut and then placed in a VSP cell between two stainless steel electrodes connected to an electrochemical impedance spectrometer (Autolab Frequency Response Analyser System—AUT30.FRA-AUTOLAB, Echo Chemie, B.V.).

Conductivity a is calculated with the following formula:

$$\sigma = e/(S \times R) \text{ where } R \text{ is the ohmic resistance of the membrane}$$

The amplitude of the disturbance is 10 mV for a frequency varying from 0.01 Hz to 100 kHz.

The resistance is measured at intersection of the high-frequency impedance values with the real axis on the Nyquist curves.

The proton conductivity has been measured at 19° C. on membranes previously swollen to saturation in ultrapure water at ambient temperature. It is in the order of 0.9 mS/cm for membrane INV-3 (80/20), of 1 mS/cm for membrane INV-4 (85/15), of 0.7 mS/cm for membrane INV-2 (75/25)

However, the proton conductivity of membrane CE-2 (polymer B, S-PEEK) is equal to 0.1 mS/cm. The proton conductivity of membrane CE-1 (polymer A, Aquivion®) is equal to 2.6 mS/cm.

Figure 6:
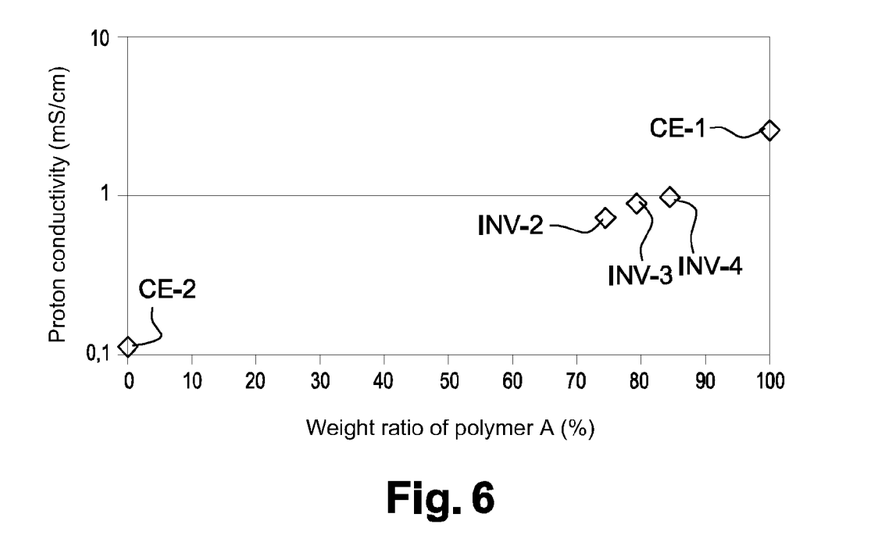
FIG. 6 illustrates the proton conductivity at 19° C. of membranes according to the present invention as compared with two prior art membranes, according to the weight ratio of polymer A.

The proton conductivities increase as the weight ratio of polymer A (Aquivion®) increases (FIG. 6).

2-5/Cell Test

The membrane is cut to a 5×5 cm² size, and then assembled in a fuel cell test single-cell.

The membrane is placed in a membrane electrode assembly (MEA) formed of two commercial Johnson Mattey commercial electrodes (0.4 mg/cm² of Pt) of 2.8×2.8 cm² (standard dimensions for a test in a 5 cm² cell).

The MEA is inserted between two filled Teflon® gaskets having a 75 micrometer thickness and the thickness difference between the electrode and the gasket is compensated by two Nafion® NRE 212 shims having a 50-micrometer thickness. The test single-cell is then closed and tightened at 5 and then 7 N.m.

The cell is started at ambient temperature under a hydrated nitrogen flow (100% relative humidity) at 300 mL/min, under a total 1-bar pressure, and then under a hydrated $H_2/O_2$ flow (100% relative humidity) at 666 mL/min.

A 0.5-V voltage is applied for 16 hours to well hydrate the membrane and to stabilize it before applying different measurement conditions.

In such conditions, the cell generates 5.2 A at 0.5 V.

The cell is then progressively heated up to 60° C., the pressure is increased to 1.41 bar, and the gas flow rate is decreased to 50 mL/minute.

Figure 7:
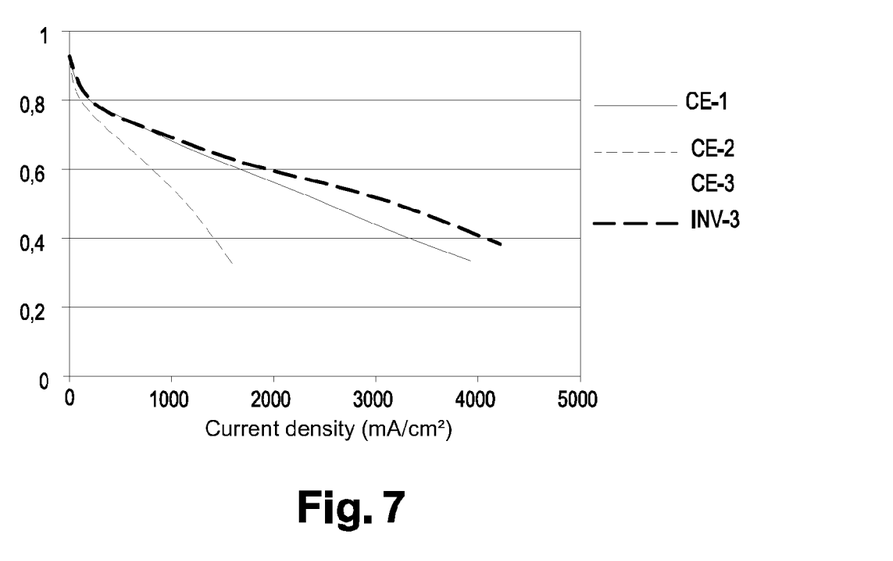
FIG. 7 illustrates the biasing curves at 60° C. of a membrane electrode assembly according to the invention as compared with a membrane electrode assembly according to prior art.

In such conditions, the cell generates 13.6 A at 0.5 V (FIG. 7).

The cell is then taken to 90° C. at 50% of relative humidity and under a 1.76-bar pressure.

Figure 8:
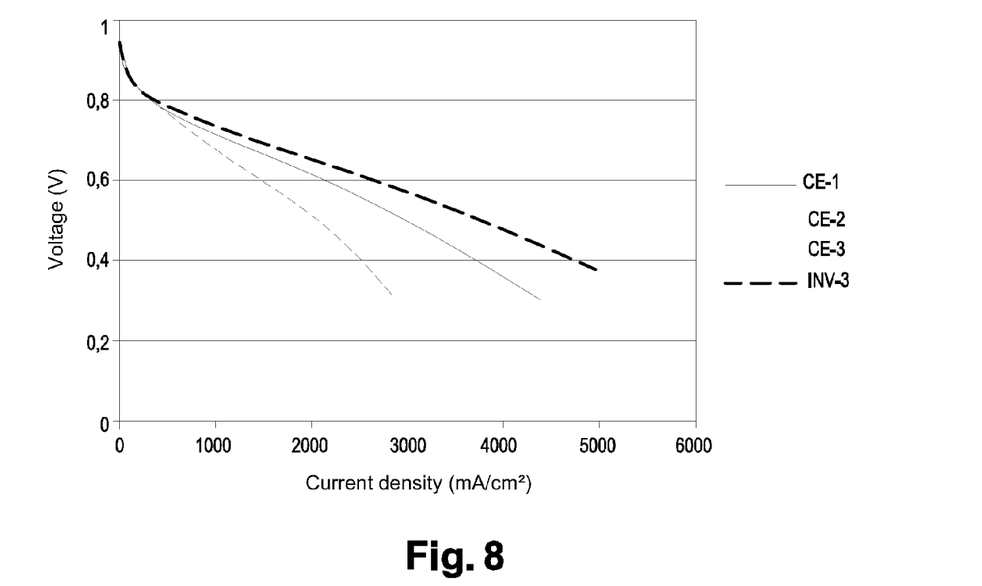
FIG. 8 illustrates the biasing curves at 90° C. of a membrane electrode assembly according to the invention as compared with a membrane electrode assembly according to prior art.

In such conditions, the cell generates 18.3 A at 0.5 V (FIG. 8).

The cell is then taken to 105° C. at 50% of relative humidity and under a 1.76-bar pressure.

Figure 9:
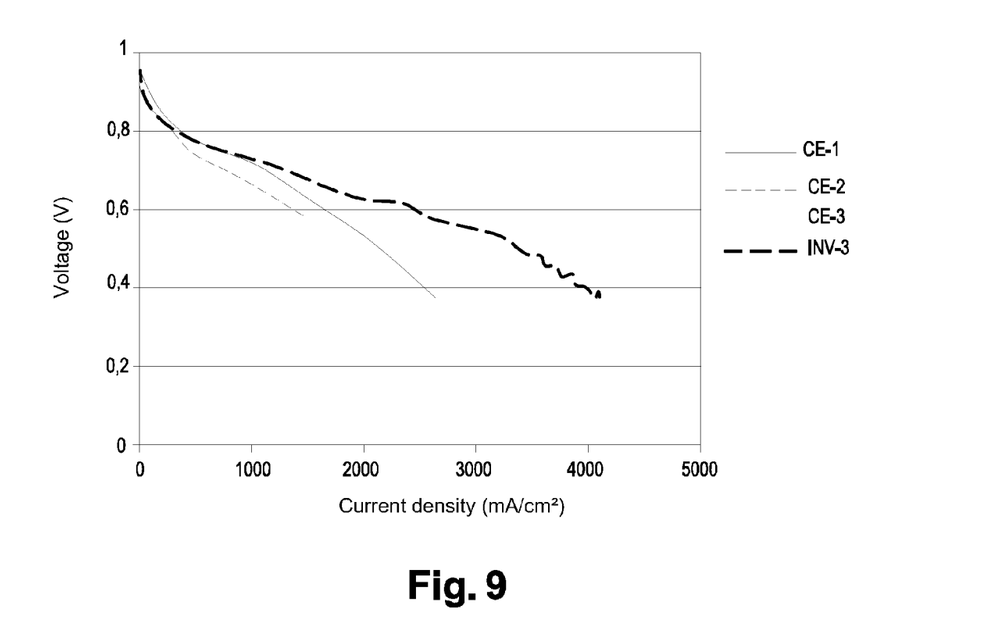
FIG. 9 illustrates the biasing curves at 105° C. of a membrane electrode assembly according to the invention as compared with a membrane electrode assembly according to prior art.

In such conditions, the cell generates 15.2 A at 0.5 V (FIG. 9).

These different operating points show that the membrane of the invention enables to operate the cell at so-called conventional temperatures, around 60° C., with performances at least similar to those of current reference membranes, as well as at higher temperatures such as from 90 to 105° C. where the performances are higher than those of current reference membranes.

What is claimed is:

1. A membrane for a proton exchange membrane fuel cell comprising, by weight with respect to the total weight of the membrane, a mixture of:

from 50 to 95% of polymer A; and from 5 to 50% by weight of polymer B;

polymer A being a perfluorinated cation exchange polymer, comprising —SO$_3^{31}$X$^+$; X being a hydrogen atom; and polymer B being a hydrocarbon aromatic polymer different from polymer A, and comprising at least one aromatic ring on its polymer chain, polymer B being functionalized with sulfonic acid groups —SO$_3$H, wherein polymer A is a sulfonic perfluorinated polymer of formula:

with x =from 100 to 1,000; y =from 3.5 to 7.5, and z =from 0 to 3.

2. The membrane for a proton exchange membrane fuel cell of claim 1, wherein polymer A has a molecular weight in the range from 10,000 to 10,000,000 g/mol and wherein polymer B has a molecular weight in the range from 1,000 to 200,000 g/mol.

3. The membrane for a proton exchange membrane fuel cell of claim 1, wherein polymer B is selected from the group consisting of polyarylenes; ether polyarylenes; fluorinated ether polyarylenes; polysulf ones; polybenzimidazoles; poly(ether ketones), poly(ether ketone ketones), poly (ether ether ketones); poly(ether sulf ones); poly(ether imides); polycarbonates; poly-2,6-dimethyl phenylene oxide; polyamide-imide; and polypyromellitimide.

4. The membrane for a proton exchange membrane fuel cell of claim 1, wherein the membrane comprises from 70 to 95% by weight of polymer A and from 5 to 30% by weight of polymer B.

5. A method of preparing the membrane claim 1, comprising the steps of:

preparing a solution of polymers A and B in at least one solvent;

shaping the membrane from the solution of polymers A and B;

evaporating the at least one solvent;

drying the membrane.

6. The method of claim 5, wherein the solvent is selected from the group consisting of N-methyl-2-pyrrolidone; N,N-dimethylacetamide; dimethylformamide; dimethylsulfoxide; and water/alcohol mixtures.

7. The method of claim 5, wherein the shaping of the membrane is performed according to a technique selected from the group consisting of casting-evaporation; coating; sputter deposition; flexography deposition; spin coating; and silk-screening deposition.

8. The method of claim 5, wherein prior to the drying step, the membrane is immersed in an acid solution, and then washed in water.

9. The method of claim 8, wherein the acid solution has a pH lower than 2, and wherein the immersion time is in the range from 15 minutes to 48 hours.

10. The method of claim 8, wherein the acid solution is a hydrochloric acid solution having a concentration in the range from 0.5 to 12 mol/L.

* * * * *

UNITED STATES PATENT AND TRADEMARK OFFICE
CERTIFICATE OF CORRECTION

PATENT NO. : 10,270,115 B2
APPLICATION NO. : 15/108719
DATED : April 23, 2019
INVENTOR(S) : Adrien Guimet et al.

Page 1 of 1

It is certified that error appears in the above-identified patent and that said Letters Patent is hereby corrected as shown below:

In the Claims

At Column 15, Line 17, "—$SO_3^{31}$ $X^+$;" should be -- -$SO_3^- X^+$; --.

At Column 16, Line 4, "polysulf ones;" should be -- polysulfones; --.

At Column 16, Line 6, "sulf ones);" should be -- sulfones); --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*